May 29, 1956　　　J. J. OSPLACK ET AL　　　2,747,424
CONICAL INVOLUTE GEARING
Filed Dec. 15, 1950　　　　　　　　　　　　　　5 Sheets-Sheet 4
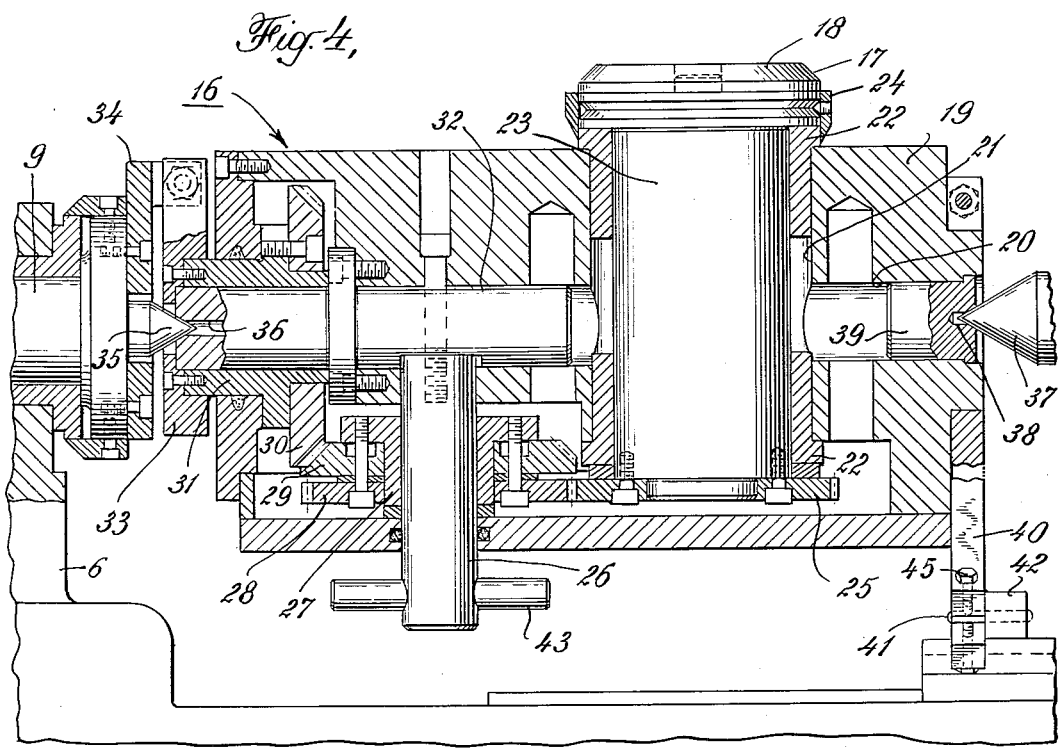
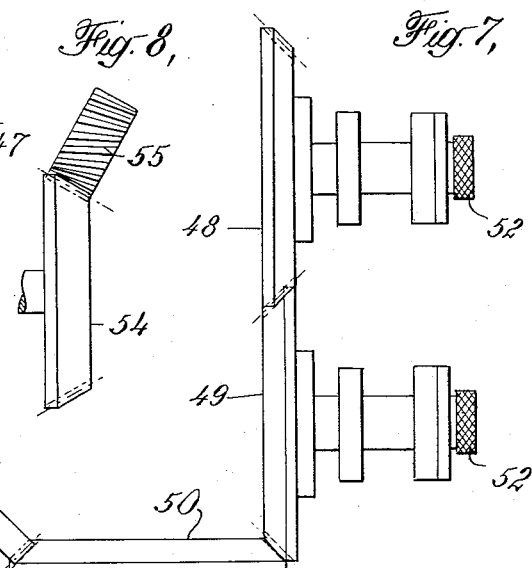
INVENTORS:
JOSEPH J. OSPLACK
ALBERT S. BEAM
BY Pennie, Edmonds,
Morton and Barrows
ATTORNEYS

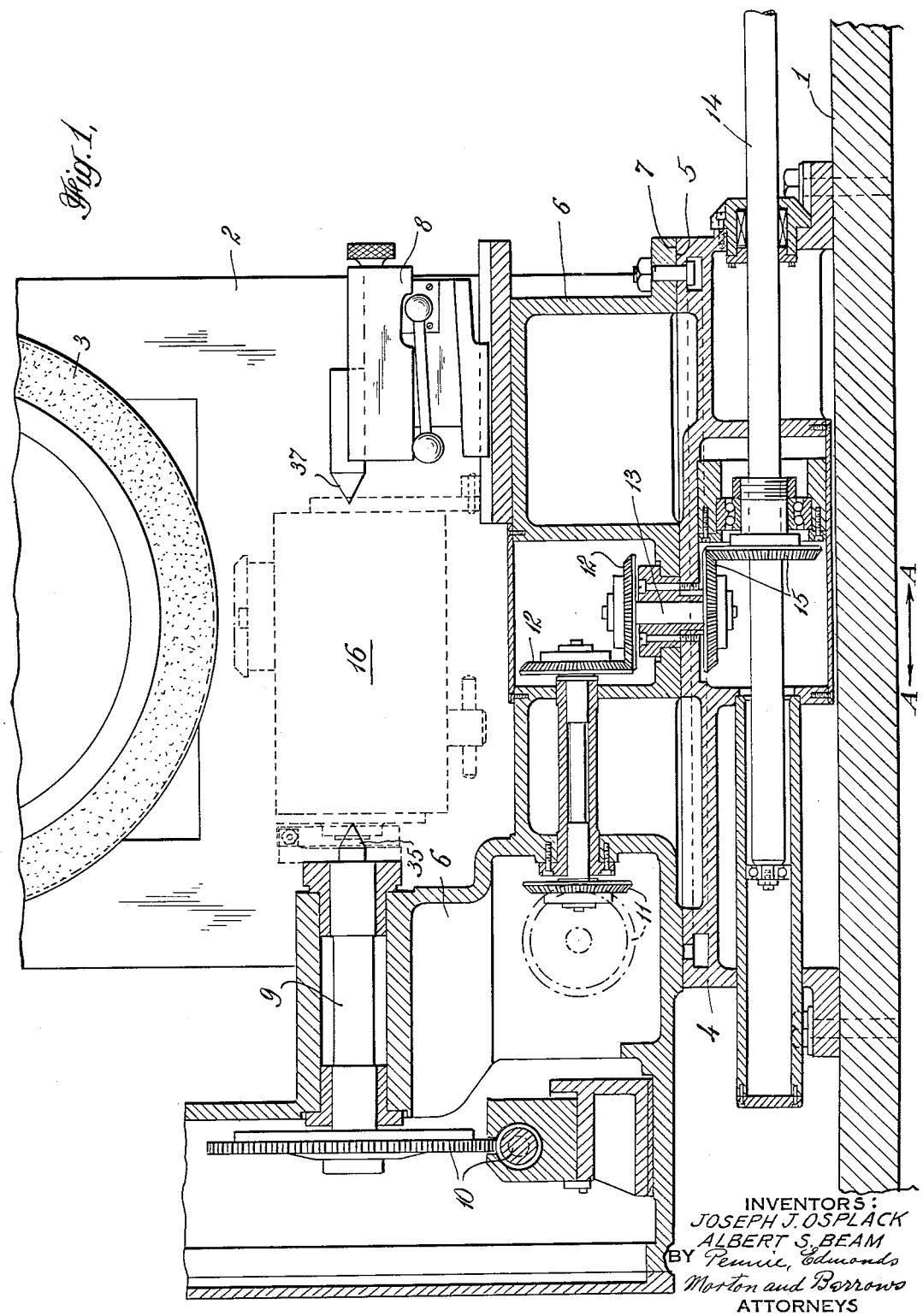

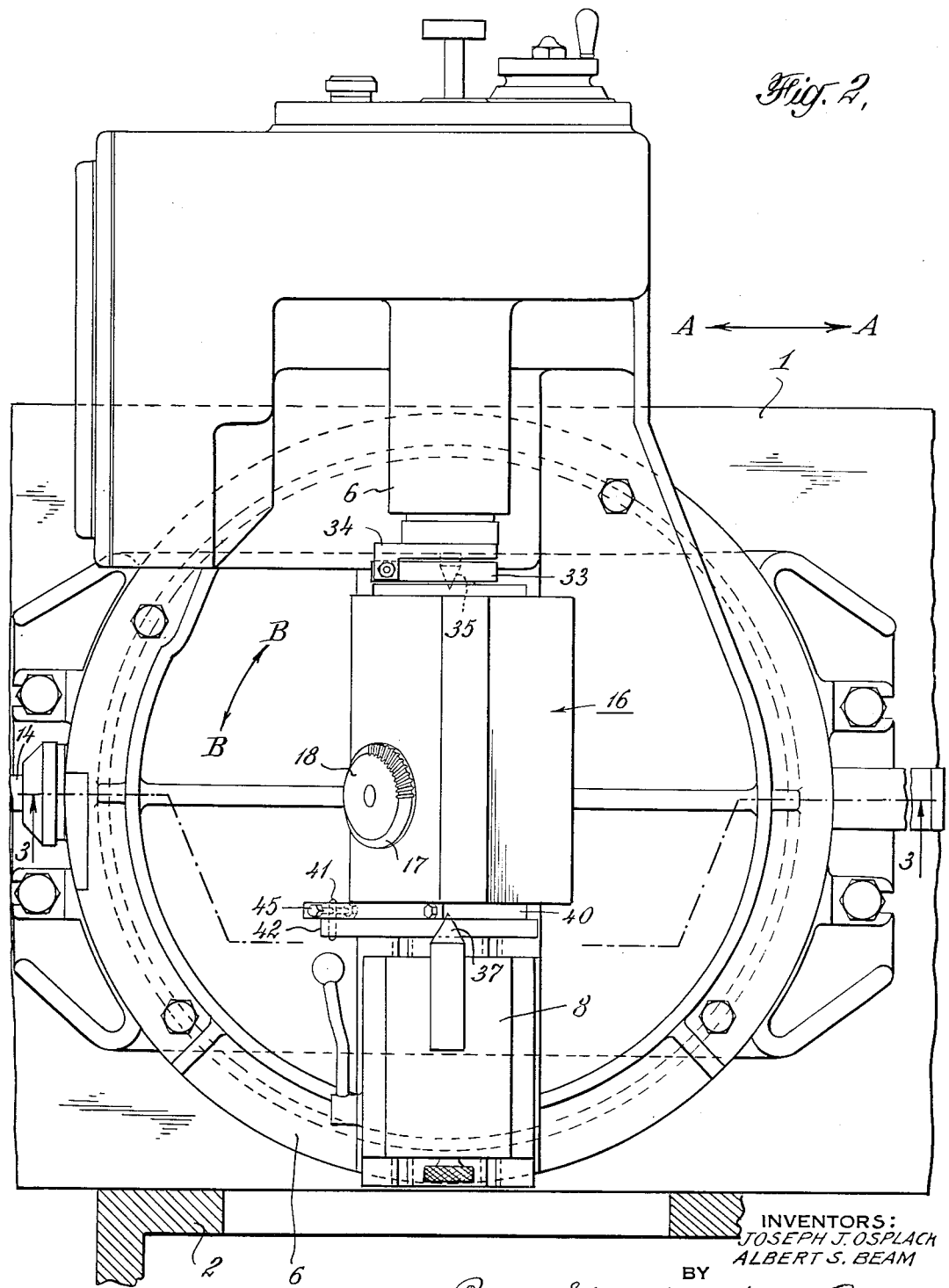

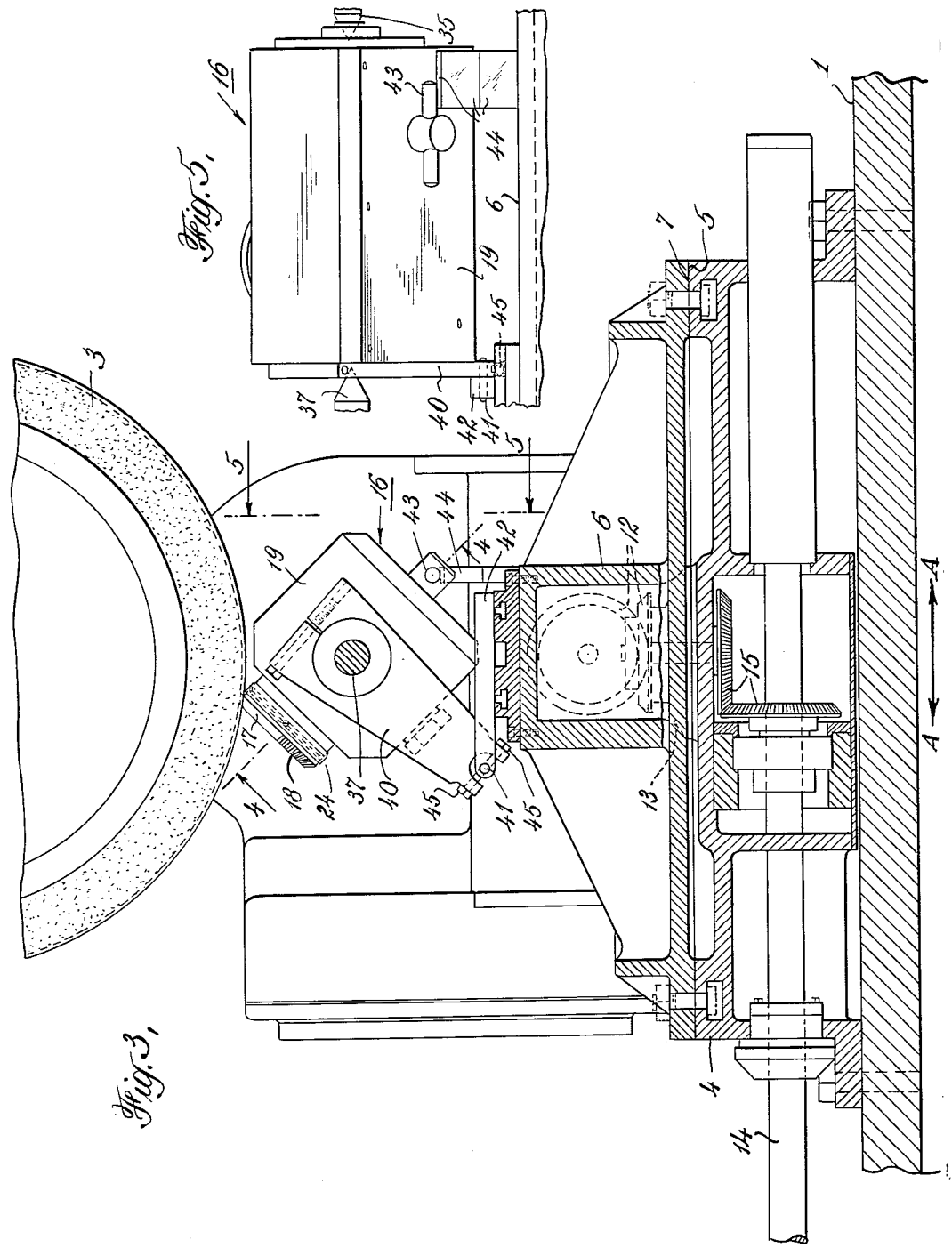

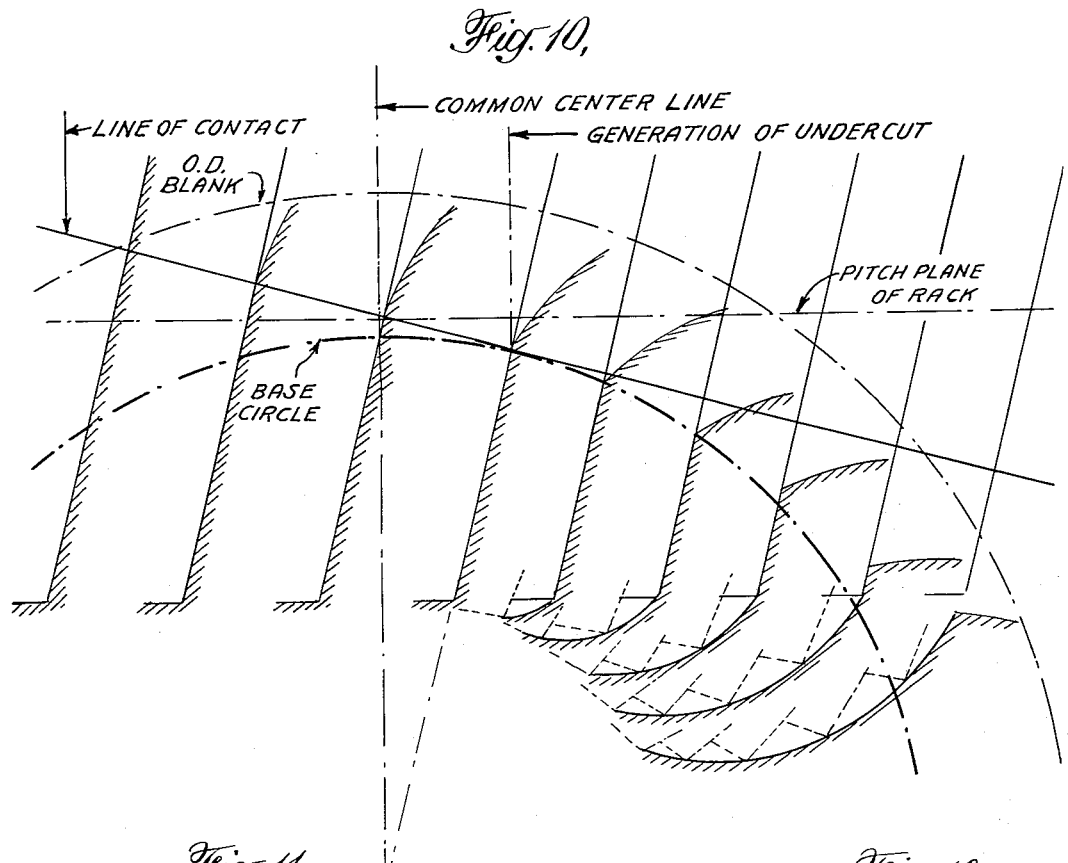
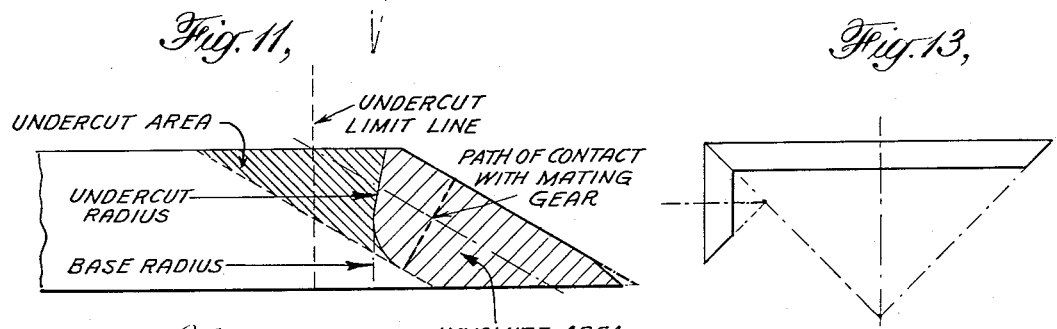
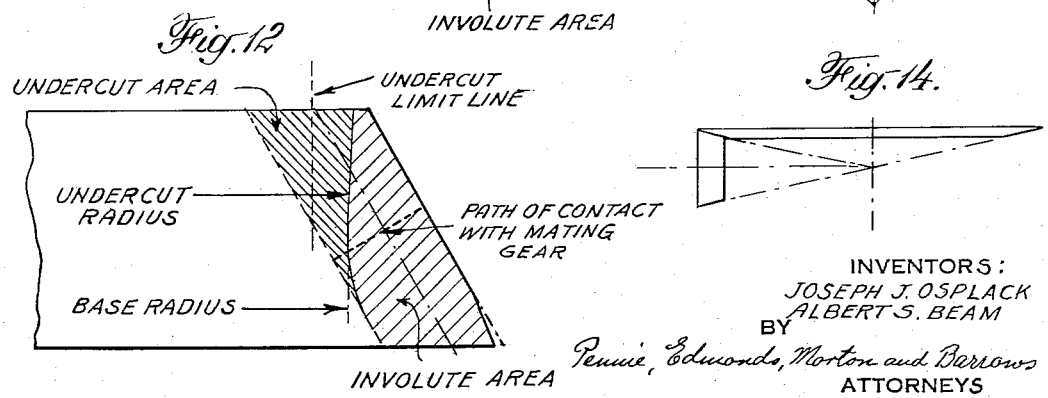

United States Patent Office 2,747,424
Patented May 29, 1956

2,747,424

CONICAL INVOLUTE GEARING

Joseph J. Osplack and Albert S. Beam, Detroit, Mich., assignors to Vinco Corporation, Detroit, Mich.

Application December 15, 1950, Serial No. 200,996

8 Claims. (Cl. 74—459.5)

This application relates to conical involute gears, especially to such gears produced by hobbing grinding from a hardened blank, and to an adapter for use with a hobbing grinding fixture for producing such gears.

It is the primary object of the invention to provide gear trains for the most accurate and precise transmission of motion, having interchangeable parts adapted for mass production. The principal field for such gearing is in instruments and like applications where load transmission is of secondary importance. For example, fire control instruments require the highest standards both of accuracy and precision and in time of war must be produced in large quantities.

It is an important object of this invention to provide gear sets for the accurate and precise transmission of motion between shafts having intersecting axes, especially those whose axes form lesser included angles greater than 40°, in which corresponding parts are interchangeable and which, therefore, do not have to be provided in mated matched sets.

It is a further object of this invention to provide useable conical involute gears which are produced by a generating process, but in which undercut is eliminated or controlled, although formed on a right circular cone whose elements make an angle in excess of about 20° with its axis.

It is a further object of this invention to provide a suitable adapter for making conical involute gears by the hobbing grinding procedure on known hobbing grinding fixtures or machines.

Conical involute gears, per se of both "spur" and "helical" types, are known. The terms "spur" and "helical," when used herein, mean, respectively, "having teeth parallel to the normal projection of the gear axis on the pitch plane of the conjugate rack" and "not having its teeth so parallel." A conical involute gear, generally, is one generated by, or conjugate to, a rack the pitch plane of which intersects the gear axis. A cylindrical involute gear, generally, is one generated by, or conjugate to, a rack the pitch plane of which is parallel to the gear axis. The simple expressions "spur gear" and "helical gear" will herein be used in their usual sense of "spur cylindrical involute gear" and "helical cylindrical involute gear," as above-defined.

The theoretical possibility and the mathematics of the geometry of conical involute gears, both spur and helical, are set forth, for example, in chapters 8.27 and 9.36 of a textbook published in London in 1946 entitled "Gears" by H. E. Merrit. In this text under the heading "Limitations of conical involute gears" (chapter 8.31) the author postulates, "Conical involute gears are not nevertheless, the answer to all such problems; they have their limitations. One of these is that the difference between the diameters of opposite ends of the gear must not be such as would lead to excessive undercutting at one end, or teeth running to a point at the other."

We have discovered that such limitations do not exist, or can be overcome, and thus have created for the first time trains of gearing including conical involute gears with large cone angles, that is, formed on a right circular cone whose elements make an angle in excess of 20° with its axis.

Conical involute gearing offers not only accuracy in maintaining a desired speed ratio between non-parallel shafts, but also the opportunity for a wide variety of gear design combinations which are impossible with any other known type of gearing.

In producing conical involute gearing, the theoretical rack on which the generating process is based traverses the gear blank at an angle; in other words, the radial distance of the rack from the center line of the blank is not constant, but diminishes from the back face to the front face. As a consequence, the tooth thickness at the pitch diameter gradually decreases. A conical gear blank generated in this manner has the general appearance of a bevel gear. However, each transverse section represents a spur gear. The tooth thickness of these spur gear elements proportionately decreases from the back to the front face.

Each spur section of the gear is conjugate to the generating rack and contacts the generating rack continuously during its rotation. Hence, the conical involute tooth is conjugate to the generating rack. It can be shown that contact between the conical involute gear tooth and the basic rack occurs along a straight line common to the rack and the conical involute tooth and that this contact line is inclined against the pitch plane of the rack.

Heretofore, the use of conical involute gearing has been deemed limited to small shaft angles because the nearly point contact area at any considerable shaft angle excludes the application of this type of gearing in its true form to the transmission of substantial loads. U. S. Patent 2,464,963 to Bregi e al. discloses an attempt to cure this difficulty by employing a shaving technique to alter the teeth of conical involute gears from their true form and thus increase their contact area. Even for the transmission of motion, the use of conical involute gearing has been deemed limited to small shaft angles because it was believed that the large cutting angles required for substantial shaft angles would result in undercutting of such severity as to destroy smooth mating action. Moreover, such gearing conventionally hobbed did not offer sufficient advantages over the conventional bevel gear to justify its use as a precision machine element for the transmission of motion, even between intersecting or skew shafts which do not carry substantial loads.

The hobbing grinding process of our invention furnishes a product of controlled precision useful in the wide field of precision instrument gearing, for example, in radar units, computing devices, timers, servo mechanisms, and the like. Instrument gear trains of this character frequently require an accuracy level which cannot be attained readily or with interchangeability with conventional bevel gears. Since conical involute gearing can be considered as composed of spur gear sections, progressively diminishing in tooth thickness and outside diameter, geometric characteristics are established with relative ease and can be controlled with substantially the same inspection equipment which is used for spur gears. It is possible with this type of gearing to meet stringent specifications on involute profile, accumulated spacing errors, tooth thickness and runout.

The peculiar geometry offers design possibilities which are not available with conventional bevel gearing and which even invade the old fields of spur gearing. Since mating conical involute gears are conjugate to a basic rack, they are not generated from a theoretical apex point around which the design of a gear set must be constructed. The same conical involute gear may mesh simultaneously with two or more conical involute gears of different pitch diameters, with cylindrical gears, with racks or worms. This diversity of applications allows numerous gear combinations which are impossible with any other type of known gearing.

Conical involute gears of equal cone angle may be used to connect parallel shafts with their front sections opposed. Backlash at fixed center distance can be controlled or completely eliminated by an axial adjustment of one or the other gear. In this arrangement, transverse planes contain spur gear sections of each gear meshing with each other, so that contact extends along a full line covering the entire length of gear engagement. Loads and speeds need, therefore, not be limited to the level of instrument service.

In addition to the wide range of possible design combinations, there are other important practical advantages. Mounting distances need not be closely maintained. If one of two conical involute gears is withdrawn axially from a tight mesh position, the mating gear may be brought forward into tight mesh without impairing conjugate action of the set. Gears designed for intersecting axes will mesh without error even if the center lines of the two shafts are not in the same plane. It may be shown by mathematical analysis that displacement of the gear axis may be allowed in any direction without affecting the proper mesh between mating conical involute gears. The permissible variation of the mounting distance allows the assembly of these gears with zero backlash at the tightest point of mesh, or in an interference engagement having a maximum of zero backlash and precision rolling action, regardless of the tooth thickness variations allowed in the production of these gears. Furthermore, it has been found that conical involute gears are not sensitive to variations in the shaft angle because the tooth surfaces are convex. They are usually designed so that the thickest portion of the tooth is near the center of the tooth face. This design locates the contact between mating conical involute gears in the center of the face without load application at the ends of the teeth.

In summary, the gearing according to our invention produced by our procedure, for example on the apparatus of our invention, can be made with a degree of dimensional accuracy not possible in many types of gearing it can replace, for example, bevel gears. The inherent precision thus obtained can, because the gearing is involute and conjugate to a basic rack, be checked by known methods of checking involute gearing. Thus a production of interchangeable gears can be obtained having over the entire batch motion transmitting accuracy equal or better than that obtained with the best quality of non-interchangeable matched mating pairs of bevel gears.

We have described our invention in detail below with the aid of the accompanying drawings in which:

Fig. 1 is a partial front elevation, partially in section, of a conventional spline grinder equipped with a hobbing grinding fixture with the location of an adapter for the generation of conical involute gears indicated thereon in dotted lines;

Fig. 2 is a partial plan view of the spline grinder and fixture illustrated in Fig. 1 with adapter in place and fixture arranged in position to grind a spur conical involute gear with the grinding wheel omitted for clarity;

Fig. 3 is a section taken on the line 3—3 of Fig. 2 including the grinding wheel;

Fig. 4 is a section through the adapter on an enlarged scale taken on the line 4—4 of Fig. 3;

Fig. 5 is an elevation of the adapter taken on the line 5—5 of Fig. 3;

Fig. 6 is an axial diametrical cross-section of a blank from which to grind a conical involute gear;

Fig. 7 is a gear train employing conical involute gearing mounted for axial adjustment;

Fig. 8 is a gear train employing a helical conical involute gear in mesh with a helical pinion;

Fig. 9 is a gear train employing a conical involute gear in mesh with a worm;

Fig. 10 is a diagrammatic illustration of the formation of undercut in the generation of involute teeth;

Figs. 11 and 12 illustrate the location of the undercut area on the tooth flanks of two different conical involute gears;

Fig. 13 illustrates a permissible meshing of two conical involute gears on intersecting shafts; and Fig. 14 illustrates the essential meshing of bevel gears to produce the same gear ratio as in Fig. 13.

In Figs. 1–5, inclusive, are illustrated certain parts of a spline grinder and a hobbing grinding fixture therefor according to the invention of Osplack application, Serial No. 59,166, filed November 9, 1948. This is essential to a full understanding of the present invention. The spline grinder includes a horizontal work table 1, reciprocable in the direction of the double-headed arrow A—A and, rising above the table 1, a grinding wheel spindle supporting column 2. A threaded grinding wheel 3 is mounted for controlled vertical motion on column 2. The axis of rotation of grinding wheel 3 is substantially perpendicular to the direction of movement of table 1.

The hobbing grinding fixture is bolted to table 1 and has its driven parts synchronized with the rotation of wheel 3. The fixture includes a fixture base casting 4. On the upper surface of casting 4 is a circular plane turntable ring 5. A head-and-tail-stock support casting 6 is mounted on base 4. A plane turntable surface 7 on the under surface of head-and-tail stock support 6 engages and is concentric with turntable ring 5. The support 6 can be turned about the center of rings 5 and 7 in the direction of the double-headed arrow B—B. A tail stock assembly 8 is slidably mounted on the stop surface of support 6. A driven head stock spindle 9 is journalled in support 6 in alignment with the tail stock proper of assembly 8.

Head stock spindle 9 is driven by worm and pinion 10 through a set of change gears (not shown), bevel gear pair 11, and bevel gear pair 12 from a vertical shaft 13 concentric with the centers of the two turntable rings 5 and 7. Vertical shaft 13 is driven from a horizontal shaft 14 by means of a bevel gear pair 15, one of which is in splined engagement with horizontal shaft 14 thus permitting free movement of table 1 without interrupting the drive of head stock spindle 9 in fixed relation to the rotation of horizontal shaft 14. By a train of gearing (not shown) the rate of rotation of horizontal shaft 14 is synchronized with the rate of rotation of grinding wheel 3.

All that has been heretofore described is a part of the above-mentioned Osplack application Serial No. 59,166 and is here described only to make plain the functioning of the present invention. In Fig. 1 the head-and-tail-stock center line fixture is shown substantially parallel to the direction of movement of table 1. This is the position in which it would be set for generating a spur gear as described in that Osplack application and according to that application such a gear would be mounted for rotation about the head-and-tail-stock center line. In addition, in Fig. 1 there is indicated by dotted lines an adapter, generally designated 16, which forms a part of the subject matter of this invention mounted in place of such a spur gear. It will be understood that, even with adapter 16 in place, so long as the head-and-tail-stock center line is in the position shown in Fig. 1, the fixture is not properly set up for the production of conical involute gears.

In Figs. 2, 3 and 5, the adapter 16 is shown in the proper position for the hobbing grinding of a conical involute gear. As shown especially in Figs. 2 and 3, the head-and-tail-stock support 6 has been turned in the direction of the double-headed arrow B—B so that the head-and-tail-stock center line is substantially perpendicular to the direction of movement of table 1. In addition, adapter 16 itself has been so positioned by the rotation about the head-and-tail-stock center line as an axis as to bring the conical surface 17 of a gear blank 18 mounted on it to a position generally tangential to grinding wheel 3.

The details of construction of the adapter 16 are best seen in Fig. 4. It is mounted between head stock spindle 9 and tail stock spindle 8. It comprises a main body portion 19 having a longitudinal bore 20 coaxial with tail and head stock spindles 8 and 9. Perpendicular to and intersecting longitudinal bore 20 is a relatively large bore 21. A pair of hardened bearing bushings 22 are set in opposite ends of bore 21. A work carrying spindle 23 is journalled in bushings 22. Clamping means 24 are provided at one end of spindle 23 for attaching thereto a gear blank 18, into the conical surface 17 of which involute teeth are to be ground. A spur gear 25 is fastened to spindle 23 at the opposite end from blank 18. A positioning pin 26 is inserted in housing 19 parallel to spindle 23. The intermediate portion of pin 26 serves as a bearing for rotatable sleeve 27. A spur gear 28 and a bevel gear 29 are attached to sleeve 27. Gear 28 is in mesh with gear 25 and bevel gear 29 is in mesh with another bevel gear 30. Bevel gear 30 is fastened to a rotatable sleeve 31 which is carried by a bearing pin 32 affixed in the bore 20 of housing 19 at the end thereof adjacent head stock spindle 9. A driver member 33 is fastened at its inner end to sleeve 31 and at its outer end to another driver member 34 which is in turn fastened to head stock spindle 9.

A center 35 carried by head stock spindle 9 supports and centers one end of the adapter 16 by engagement with a centered hole 36 in bearing pin 32. A similar center 37 carried by tail stock spindle 8 supports the other end of the adapter 16 by engagement with a centered hole 38 in a plug 39 located in the adjacent end of bore 20. The angular position of adapter 16 about centers 35 and 37 is fixed by the coaction of an adjustable clamp arm 40 with a stop pin 41 mounted on a stop pin bar 42. Bar 42 is affixed to head-and-tail-stock support 6. Set up of this angular adjustment is accomplished by the use of gage blocks 44 interposed between a sine bar rod 43 located in positioning pin 26 outside housing 19 parallel to bore 20 and the upper surface of a portion of head-and-tail stock support 6. Adjusting screws 45 in the outer end of adjustable clamp bar 40 are manipulated in engagement with stop pin 41 to bring sine bar rod 43 in contact with gage blocks 44 acting as a sine bar. The angle thus set off is determined by the cone angle desired on the conical involute gear to be ground and roughly corresponds to the cone angle of the conical surface 17 of blank 18.

The function of adapter 16 is, as is readily apparent, to position blank 18 and to synchronize the rate of rotation imparted to it with the rate of rotation of threaded grinding wheel 3. As already explained, the rate of rotation of head stock spindle 9 is synchronized with the rate of rotation of grinding wheel 3. By means of change gears in the drive train between spindle 9 and wheel 3 rotational rates are so synchronized that, for each revolution of wheel 3, blank 18 is moved through a peripheral distance equal to the lead of the thread on wheel 3. In other words, wheel and blank rotate in hobbing ratio.

The depth of cut is controlled by vertical movement of wheel 3. The rate of feed is controlled by the rate of travel of table 1. The result of hobbing grinding with adapter 16 on the fixture as shown in the drawings is the production of a conical involute gear.

In Fig. 6 is illustrated a blank 18 from which the machine just described can be caused to produce a conical involute gear. Such a blank may, of course, be made of any suitable material such as mild steel, tool steel, stainless steel, iron, aluminum, bronze, brass, Micarta, other plastics, and the like. Hard materials are to be preferred in most cases because contact between mating conical involute gears on non-parallel shafts is confined to a very limited area. In fact, the maximum advantage of the hobbing grinding process just described for the manufacture of conical involute gears is attained by use of the process of grinding gears from a hardened blank described in Osplack application Serial No. 650,831, filed February 28, 1946, upon which the present invention is a refinement. In the practice of this method, gears are hob ground directly from a blank hardened at least to the depth of the teeth, the finished product thus having working surfaces of the hardest material directly formed in their final shape without the necessity of any post-shaping heat treatment and risk of consequent distortion.

The blank shown in Fig. 6 has a large central mounting hole 46. In addition to a conical face 17, the blank has a cylindrical face 47. The pitch diameter of the intended gear is indicated by the double arrow marked P. D. This pitch diameter is substantially less than the outside diameter of the cylindrical portion 47. It is an advantage of conical involute gearing that gears of a different number of teeth may be ground from blanks of the same outside diameter. For example, a blank such as that illustrated in Fig. 6 is formed upon a right circular cone whose elements make an angle of 45° with its axis. If such a blank had a pitch diameter of 3", a diametrical pitch of 24 would obviously produce a gear which has 72 teeth. From an identical blank, employing the same grinding wheel hob, a gear of 70 teeth can be ground simply by selecting a slightly smaller pitch diameter. Both gears will be conjugate to the same basic rack and will run together smoothly. For providing for small speed changes this affords great flexibility to a designer.

One of the possible gear trains employing conical involute gears is illustrated in Fig. 7. This train includes a series of three conical involute gears, 48, 49 and 50, and a spur gear 51. Each of the conical involute gears is mounted to be axially adjustable by means of a mechanism 52 of any known construction. Spur gear 51 may be mounted on a shaft 53 axially fixed. In the meshing relationship between spur gear 51 and conical involute gear 50 it is necessary for both gears to be conjugate to the same basic rack, but their contact will be a point contact. By simple axial adjustment of conical involute gear 50, backlash between it and spur gear 51 can be reduced to any desired level, including an average zero backlash and absolute zero backlash, where the backlash present at the widest possible tooth spacing is reduced to zero.

Assume the desired backlash adjustment to have been made between gears 50 and 51. Consider next the mesh between gear 50 and gear 49. Both are conical involute gears and are shown in the drawing as being of like cone angle. This is not necessary for connecting non-parallel shafts nor is it necessary that they have the same number of teeth. So long as both are conjugate to the same basic rack they will run together smoothly, though with only point contact. By axial adjustment of gear 49 backlash between gear 50 and gear 49 can be reduced exactly as described before.

Assume the desired backlash adjustment to have been made between gears 49 and 50. Consider next the mesh between gear 49 and gear 48. Both are again conical involute gears. In order to permit the shafts on which these gears are mounted to be parallel, it is not necessary that the gears have the same cone angle. When they do have the same cone angle and are in mesh face-to-face, as shown, the contact between the two gears will be line contact. Moreover, by axial adjustment of gear 48, backlash between gears 48 and 49 can be controlled exactly as before described.

It is thus possible for the gear train illustrated in Fig. 7 to have zero backlash between gear 48 and gear 51. By backlash in this connection is meant play between the gears without any deformation of teeth taking place.

In the foregoing, all the conical involute gears described have been of the spur type. If desired, however, a helical conical involute gear may be ground, the perpendicularity of the head-and-tail stock center line to the motion of table 1 (see Fig. 2) being departed from by an amount equal to the desired helix angle. Such a helical conical involute gear 54 will run with a cylindrical helical gear 55 if conjugate to the same rack as illustrated in Fig. 8 or with a worm 56 conjugate to the same rack as illustrated in Fig. 9. In both of these cases backlash can be controlled by axial adjustment of helical conical involute gear 54 as previously described for spur conical gears.

In Fig. 10 there is illustrated diagrammatically the manner in which undercut is produced in the generation of an involute by a hob cutting below the base circle. Where gears are being ground from a cylindrical blank this undercutting is of no consequence as it remains the same entirely across the tooth face and can be controlled by modification of the gear design. However, in the generation of conical involute gears the depth of cut in relation to the base circles does not remain the same across the entire face of the tooth and, therefore, merely adjusting the depth of cut will not in all cases produce a useful gear, the degree of undercut at the smaller end of the blank may become inadmissible. We have discovered that in the hob grinding of gears this undercut formation can be controlled to any desired or useful extent merely by reducing the axial width of the threaded wheel. So reducing the width of the wheel, does, of course, throw a heavier grinding load on the remaining threads, but, by this method and taking into consideration the circumstances of intended use of a given gear, harmful undercut can be eliminated.

Figs. 11 and 12 illustrate, on respective tooth flanks of two representative conical involute gears, the formation of undercut and the desirability of keeping this undercut area clear of the locus of the contact point. The gear illustrate in Fig. 11 is formed on a right circular cone whose elements make an angle of 30° with its axis; the gear in Fig. 12, on one whose elements make an angle of 60° with its axis. The distance of the undercut area from the locus of the contact point on the gear in Fig. 11 exceeds the corresponding distance on the mating gear in Fig. 12. By increasing the cone angle of the gear in Fig. 11 and decreasing the cone angle of the gear in Fig. 12, these distances can be equalized.

Figs. 13 and 14 contrast the mating of conical involute gears (Fig. 13) to the mating of ordinary bevel gear (Fig. 14), each set being designed to produce the same gear reduction. It is a requirement as shown in Fig. 14 in ordinary bevel gearing that both gears have a common cone apex point. Moreover, these gears are produced in matched pairs and will operate only with each other. Consequently, a third bevel gear, even though it has the same pitch and pressure angle will not operate with either of the other two. These limitations do not exist with conical involute gears and by adjustment of the axial position of the gears on the two shafts, the gear ratio can be changed, merely changing the number of teeth of one of the mating gears. That is to say, either of the conical involute gears shown in Fig. 13 will operate with any other conical involute gear that has the same pitch and pressure angle.

We claim:

1. A conical involute gear formed on a right circular cone whose element make an angle in excess of 20° with its axis.

2. A gear train comprising a pair of gears in mesh at least one of which is a conical involute gear formed on a right circular cone whose elements make an angle in excess of 20° with its axis.

3. A gear train comprising a pair of conical involute gears in mesh each of which is formed on a right circular cone whose elements make an angle in excess of 20° with its axis.

4. A gear train according to claim 3 in which the two gears have the same cone angle and are mounted on parallel shafts face-to-face.

5. A gear train comprising a helical gear in mesh with a helical conical involute gear formed on a right circular cone whose elements make an angle in excess of 20° with its axis.

6. A gear train comprising a worm in mesh with a conical involute gear formed on a right circular cone whose elements make an angle in excess of 20° with its axis.

7. A set of conical involute gears having cone angles of 90° measured at the apex all conjugate to the same basic rack comprising a plurality of gears each with a different number of teeth.

8. A gear train including a conical involute gear formed on a right circular cone whose elements make an angle in excess of 20° with its axis, said conical involute gear having undercut on the flank surfaces of its teeth in the vicinity of the loci of successive contact points with a mating gear only below the base circle.

References Cited in the file of this patent

UNITED STATES PATENTS

| | | |
|---|---|---|
| 662,344 | Boyd et al. | Nov. 20, 1900 |
| 1,252,509 | Thomas | Jan. 18, 1918 |
| 1,271,495 | Ward | July 2, 1918 |
| 2,028,786 | Lamatsch | June 28, 1936 |
| 2,183,285 | Wildhaber | Dec. 12, 1939 |
| 2,464,963 | Bregi | Mar. 22, 1949 |

OTHER REFERENCES

"Spur and Bevel Gearing," page 201, Industrial press, 1914.